US012374940B1

(12) United States Patent
Ho et al.

(10) Patent No.: US 12,374,940 B1
(45) Date of Patent: Jul. 29, 2025

(54) APPARATUS, SYSTEM, AND METHOD FOR INTERACTIVE WIRELESS CHARGING OF HEAD-MOUNTED DISPLAYS

(71) Applicant: Meta Platforms Technologies, LLC, Menlo Park, CA (US)

(72) Inventors: John Ho, Sunnyvale, CA (US); Jiang Zhu, Cupertino, CA (US); Duane Martin Evans, Snohomish, WA (US); James Andrew Hammer, Kirkland, WA (US)

(73) Assignee: Meta Platforms Technologies, LLC

( * ) Notice: Subject to any disclaimer, the term of this patent is extended or adjusted under 35 U.S.C. 154(b) by 203 days.

(21) Appl. No.: 18/170,882

(22) Filed: Feb. 17, 2023

(51) Int. Cl.
*H02J 50/90* (2016.01)
*G02B 27/01* (2006.01)
*G06F 1/16* (2006.01)
*G08B 21/18* (2006.01)
*H02J 50/10* (2016.01)

(52) U.S. Cl.
CPC .......... *H02J 50/90* (2016.02); *G02B 27/0172* (2013.01); *G06F 1/163* (2013.01); *G08B 21/18* (2013.01); *H02J 50/10* (2016.02); *G02B 2027/0138* (2013.01); *G02B 2027/014* (2013.01); *G02B 2027/0141* (2013.01)

(58) Field of Classification Search
CPC ...... H02J 50/99; H02J 50/10; G02B 27/0172; G02B 2027/0138; G02B 2027/014; G02B 2027/0141
USPC ...................................................... 340/539.11
See application file for complete search history.

(56) References Cited

U.S. PATENT DOCUMENTS

| 2017/0288475 | A1* | 10/2017 | Lee ..................... H02J 7/00034 |
| 2020/0247257 | A1* | 8/2020 | Ming ..................... H02J 50/10 |
| 2021/0135509 | A1* | 5/2021 | Pan ......................... H02J 50/12 |
| 2023/0069217 | A1* | 3/2023 | Yoon ...................... H02J 50/80 |
| 2023/0139256 | A1* | 5/2023 | Kim .................. H02J 7/007188 |
| | | | 320/137 |

* cited by examiner

*Primary Examiner* — Kam Wan Ma
(74) *Attorney, Agent, or Firm* — FOLEY & LARDNER LLP

(57) ABSTRACT

A system comprising (1) a wireless charger configured to wirelessly transfer power within a coverage area, (2) a head-mounted display dimensioned to be worn by a user, wherein the head-mounted display is configured to obtain data indicative of a current position of the head-mounted display relative to the coverage area, and (3) at least one processing device configured to provide at least one indicator of an effective charging position for the head-mounted display relative to the coverage area based at least in part on the data. Various other apparatuses, systems, and methods are also disclosed.

20 Claims, 13 Drawing Sheets

APPARATUS, SYSTEM, AND METHOD FOR INTERACTIVE WIRELESS CHARGING OF HEAD-MOUNTED DISPLAYS

BRIEF DESCRIPTION OF DRAWINGS

The accompanying Drawings illustrate a number of exemplary embodiments and are parts of the specification. Together with the following description, the Drawings demonstrate and explain various principles of the instant disclosure.

Figure 1:
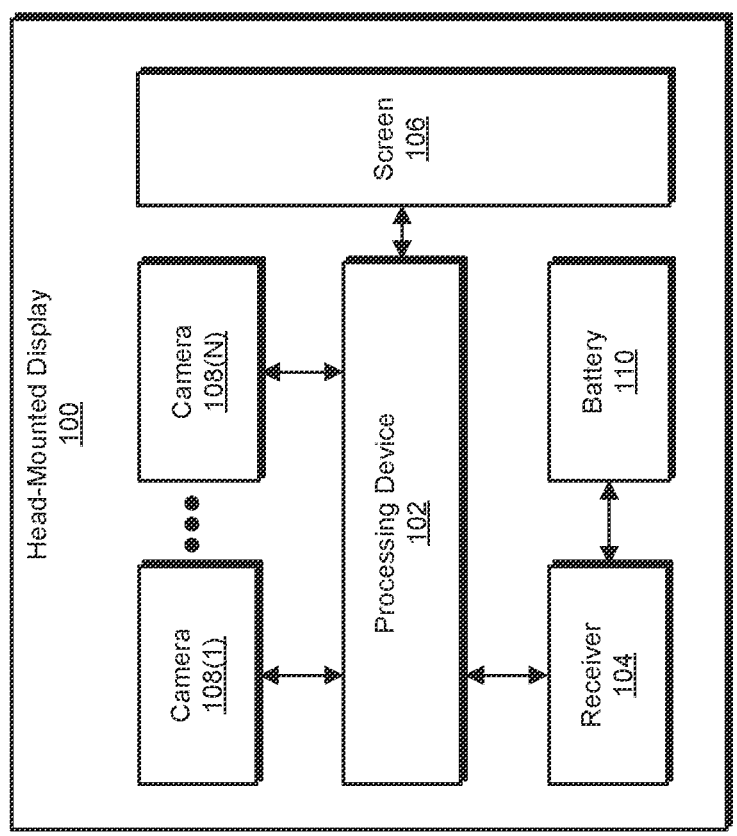
FIG. 1 is an illustration of an exemplary head-mounted display (HMD) capable of being charged via a wireless power transfer according to one or more embodiments of this disclosure.

While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, combinations, equivalents, and alternatives falling within this disclosure.

DETAILED DESCRIPTION

The present disclosure is generally directed to apparatuses, systems, and methods for interactive wireless charging of HMDs. As will be explained in greater detail below, these apparatuses, systems, and methods may provide numerous features and benefits.

Artificial reality often provides a rich, immersive experience in which users are able to interact with virtual objects and/or environments in one way or another. In this context, artificial reality may constitute a form of reality that has been altered by virtual objects for presentation to a user. Such artificial reality may include and/or represent virtual reality (VR), augmented reality (AR), mixed reality, hybrid reality, or some combination and/or variation one or more of the same.

Although artificial-reality systems are commonly implemented for gaming and other entertainment purposes, such systems are also implemented for purposes outside of recreation. For example, governments may use them for military training simulations, doctors may use them to practice surgery, engineers may use them as visualization aids, and co-workers may use them to facilitate inter-personal interactions and collaboration from across the globe.

In some examples, artificial reality may be implemented through HMDs worn by users. Such users may need to charge the batteries of the HMDs on a fairly regular basis to facilitate and/or support continued use. Although wired charging remains a prevalent option for users of artificial-reality HMDs, wireless charging may continue to increase in popularity and/or become more widespread in the HMD community for various reasons (e.g., convenience, visual appeal, durability, longevity, etc.).

Wireless charging may include and/or involve transferring power from a transmitter to a receiver through the use of wireless electromagnetic fields. In some examples, the positioning of the receiver relative to the transmitter may be an important consideration and/or factor for ensuring and/or maintaining an efficient and/or effective transfer of power. For example, if an HMD's power receiver is too close to or too far from a wireless power transmitter, the HMD's power receiver may be unable to establish and/or maintain an efficient and/or effective power transfer from the wireless power transmitter. As a result, if a user places the HMD in a position that is unfavorable to the constraints of wireless charging, the HMD's battery may take longer than necessary to charge or may even fail to charge at all. The instant disclosure, therefore, identifies and addresses a need for additional apparatuses, systems, and methods that facilitate efficient and effective wireless charging of HMDs through certain interactions.

As will be described in greater detail below, some embodiments of the instant disclosure may be directed to intelligently guiding artificial-reality users via HMDs to efficient wireless charging positions within an area equipped with near-field and/or far-field wireless charging technology. For example, an artificial-reality user wearing an HMD may be presented with an indicator and/or a map illustrating the most efficient and/or effective position or area for charging the HMD via a near-field or far-field wireless charging transmitter situated in a room. In one example, the HMD may rely on position information, such as simultaneous localization and mapping (SLAM) data, to deduce and/or infer optimal locations within the room for wireless charging. In this example, the HMD may present and/or display a visual representation of such locations for the user to consider when deciding where to place the HMD for wireless charging.

Additionally or alternatively, the HMD may rely on power-transfer information indicative of the amount of power being transferred from the near-field or far-field wireless charging transmitter to the HMD in its current position. In one example, the HMD may then interactively and/or graphically instruct or guide the user to move in one direction or another to improve the power-transfer effectiveness and/or efficiency of the wireless charge.

The following will provide, with reference to FIGS. 1-7, detailed descriptions of exemplary apparatuses, systems, components, and corresponding implementations for interactive wireless charging of HMDs. In addition, detailed descriptions of methods for interactive wireless charging of HMDs in connection with FIG. 8. The discussion corresponding to FIGS. 9-13 will provide detailed descriptions of types of exemplary artificial-reality devices, wearables, and/or associated systems that may support and/or contribute to interactive wireless charging of HMDs.

FIG. 1 illustrates an exemplary HMD 100 capable of being charged via a wireless power transfer. As illustrated in FIG. 1, exemplary HMD 100 may include and/or represent a processing device 102, a receiver 104, a screen 106, one or more cameras 108(1)-(N), and/or a battery 110. In some examples, processing device 102 may be communicatively and/or electrically coupled to receiver 104, screen 106, cameras 108(1)-(N), and/or battery 110. In one example, HMD 100 may be dimensioned, configured, and/or equipped to be worn by a user.

In some examples, HMD 100 may refer to and/or represent any type of electronic display and/or visual device that is worn on and/or mounted to a user's head or face. In one example, HMD 100 may include and/or represent a pair of AR glasses designed to be worn on and/or secured to a user's head or face. In this example, screen 106 may include and/or represent lenses and/or corresponding partially see-through components on such AR glasses.

In another example, HMD 100 may include and/or represent a VR headset designed to be worn on and/or secured to a user's head or face. In this example, screen 106 may present, display, and/or overlay certain virtual and/or visual features atop and/or on imagery of the user's environment visible via see-through lenses and/or captured via cameras 108(1)-(N). In certain implementations, cameras 108(1)-(N) may be directed and/or aimed toward the user's line of sight and/or field of view.

In some examples, processing device 102 may include and/or represent any type or form of hardware-implemented processor and/or compute module capable of interpreting and/or executing computer-readable instructions. Additionally or alternatively, processing device 102 may include and/or represent any type or form of circuitry that processes, converts, and/or transforms input, data, or signals in one way or another. In one example, processing device 102 may include and/or represent multiple circuits distributed within HMD 100 and/or combined to form a processing system. Examples of processing device 102 include, without limitation, physical processors, central processing units (CPUs), microprocessors, microcontrollers, field-programmable gate arrays (FPGAs) that implement softcore processors, application-specific integrated circuits (ASICs), systems on a chip (SoCs), parallel accelerated processors, tensor cores, integrated circuits, chiplets, portions of one or more of the same, variations or combinations of one or more of the same, and/or any other suitable processing device.

In some examples, receiver 104 may include and/or represent any type or form of device, component, and/or mechanism capable of wirelessly receiving power and/or generating an electric current in response to stimuli received wirelessly. For example, receiver 104 may include and/or represent one or more induction coils that generate, create, and/or produce an electric current through electromagnetic induction initiated by a wireless charger (e.g., wireless charger 200 in FIG. 2). In this example, the wireless charger may transfer power and/or energy to receiver 104 via an inductive coupling. Accordingly, the wireless charger may produce an alternating current that traverses and/or passes through one or more induction coils of a transmitter, which generates a magnetic field whose strength vacillates relative to and/or commensurate with the alternating current. This magnetic field may then stimulate and/or induce an alternating current in the induction coils of receiver 104, which is subsequently used to charge battery 110.

In another example, receiver 104 may include and/or represent one or more antennas that generate electric current through electromagnetic waves incident on receiver 104 from wireless charger 200. In this example, wireless charger 200 may transfer power and/or energy to receiver via electromagnetic radiation. Accordingly, wireless charger 200 may produce electromagnetic waves that radiate from transmitter 204 to receiver 104. These electromagnetic waves may then stimulate and/or induce an electric current in the antennas of receiver 104, which is subsequently used to charge battery 110.

In some examples, cameras 108(1)-(N) may include and/or represent any type or form of device, sensor, and/or mechanism capable of capturing and/or recording imagery or video. Examples of cameras 108(1)-(N) include, without limitation, wide-angle cameras, spherical cameras, fish-eye cameras, compound-eye cameras, stereo cameras, multi-cameras, red-green-blue (RGB) cameras, time-of-flight cameras, light detection and ranging (lidar) cameras or sensors, range finders, portions of one or more of the same, variations or combinations of one or more of the same, and/or any other suitable cameras.

In some examples, screen 106 may include and/or represent any type or form of device, display, panel, and/or component that displays and/or presents visual and/or optical content for viewing by a user. In one example, screen 106 may be fully and/or partially see-through to support and/or facilitate AR. Examples of screen 106 include, without limitation, embedded displays, liquid crystal displays (LCDs), light-emitting diode (LED) displays, microLED displays, plasma displays, variations or combinations of one or more of the same, and/or any other suitable screen.

In some examples, cameras 108(1)-(N) may capture and/or record images of the environment surrounding the user wearing HMD 100. In one example, receiver 104 may receive power from a wireless charger located in the surrounding environment. In this example, the power received by receiver 104 may be used to charge and/or recharge battery 110. In certain implementations, battery 110 may power and/or support the operation of HMD 100 for the user.

In some examples, processing device 102 may generate and/or obtain data indicative of a current position of HMD 100 relative to a coverage area of a wireless charger. For example, processing device 102 may generate and/or obtain SLAM data corresponding to the position of HMD 100 relative to the wireless charger. In one example, the SLAM data may include and/or represent relative, localization, positional, and/or triangulation coordinates corresponding to the position of HMD 100 and/or the wireless charger. Additionally or alternatively, processing device 102 may generate and/or obtain power-transfer information corresponding to the amount of power transferred from the wireless charger to HMD 100 at a given moment and/or in a certain position.

In one example, processing device 102 may generate and/or obtain one or more indicators of an effective charging position for HMD 100 relative to the coverage area of the wireless charger. For example, processing device 102 may generate and/or obtain a visual marker and/or an audio instruction intended to guide the user to the effective charging position for HMD 100. Processing device 102 may then provide at least one of the indicators for visual presentation and/or display to the user via screen 106. Additionally or alternatively, processing device 102 may provide at least one of the indicators for audio presentation and/or display to the user via a speaker and/or an electroacoustic transducer.

Figure 2:
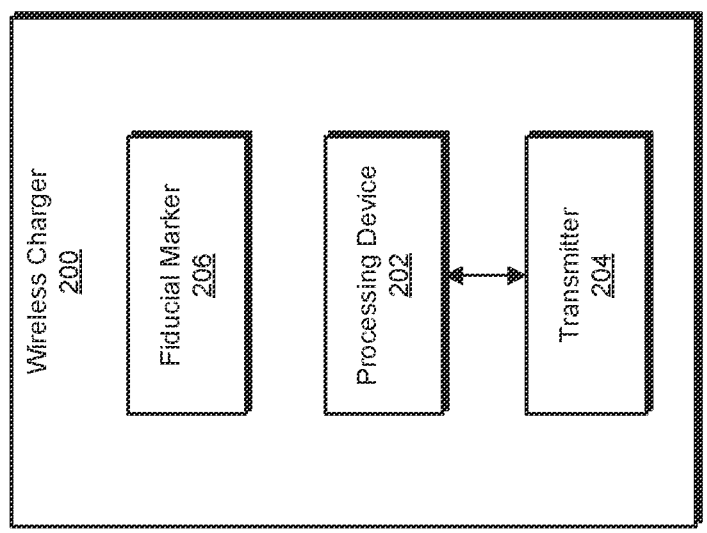
FIG. 2 is an illustration of an exemplary wireless charger capable of facilitating and/or sourcing a wireless power transfer to an HMD according to one or more embodiments of this disclosure.

FIG. 2 illustrates an exemplary wireless charger 200 capable of charging HMD 100 via a wireless power transfer. In some examples, wireless charger 200 may include and/or represent certain components, configurations, and/or features that perform and/or provide functionalities that are similar and/or identical to those described above in connection with FIG. 1. As illustrated in FIG. 2, exemplary wireless charger 200 may include and/or represent a processing device 202, a transmitter 204, and/or a fiducial marker 206. In one example, wireless charger 200 may be stationed, fixed, and/or installed in an environment (e.g., a room) occupied by a user of HMD 100. For example, wireless charger 200 may be invisibly installed and/or integrated into a piece of furniture (e.g., a table, chair, sofa, etc.) within that environment.

In some examples, wireless charger 200 may be plugged into a power outlet to draw power that is subsequently transferred to HMD 100 via electromagnetic induction. In certain examples, processing device 202 may include and/or represent any type or form of hardware-implemented processor and/or compute module capable of interpreting and/or executing computer-readable instructions. In one example, processing device 202 may include and/or represent multiple circuits distributed within wireless charger 200 and/or combined to form a processing system. Examples of processing device 202 include, without limitation, physical processors, CPUs, microprocessors, microcontrollers, FPGAs, ASICs, SoCs, parallel accelerated processors, tensor cores, integrated circuits, chiplets, portions of one or more of the same, variations or combinations of one or more of the same, and/or any other suitable processing device.

In some examples, transmitter 204 may include and/or represent any type or form of device, component, and/or mechanism capable of wirelessly transmitting power and/or stimulating or initiating electromagnetic induction. For example, transmitter 204 may include and/or represent one or more induction coils and/or radiating antennas through which an alternating current traverses and/or passes to produce an electromagnetic field whose strength vacillates accordingly. In this example, the magnetic field may then stimulate and/or induce an alternating current in one or more induction coils of receiver 104, which is subsequently used to charge battery 110.

In some examples, fiducial marker 206 may include and/or represent any type or form of communication, message, and/or marker emitted or exhibited by wireless charger 200 to indicate its location and/or coverage area to HMD 100. In one example, fiducial marker 206 may include and/or represent an enclosure, a housing, and/or a physical feature that is recognized by HMD 100 as part of wireless charger 200. Additionally or alternatively, fiducial marker 206 may include and/or represent a beacon, such as a radio-frequency (RF) signal and/or an audio signal, that indicates and/or is used to determine a location of wireless charger 200.

In some examples, wireless charger 200 may include and/or represent a near-field charger configured to transmit power to HMD 100 at very close range (e.g., when HMD 100 is positioned atop wireless charger 200 and/or within a few inches of wireless charger 200). In other examples, wireless charger 200 may include and/or represent a far-field charger configured to transmit power to HMD 100 at mid-range and/or long range (e.g., when HMD 100 is positioned several feet away from wireless charger 200 and/or across the room from wireless charger 200). In one example, the far-field charger may support and/or facilitate wirelessly charging HMD 100 while the user wears, operates, and/or otherwise uses HMD 100.

In some examples, wireless charger 200 may wirelessly transmit a charging beam via transmitter 204. In one example, processing device 202 may modify the charging beam in one way or another to achieve an effective charging position for HMD 100 based at least in part on one or more indicators (e.g., SLAM data, power-transfer data, etc.) provided by HMD 100. For example, processing device 202 may direct and/or cause wireless charger 200 to steer and/or move the charging beam to the effective charging position for HMD 100 based at least in part on one or more of those indicators. Additionally or alternatively, processing device 202 may change one or more settings of wireless charger 200 to alter the charging beam (e.g., alter its frequency, width, length, reach, and/or strength) based at least in part on one or more of those indicators. As a result of this alteration, the charging beam may reach the effective charging position of HMD 100.

Figure 3:
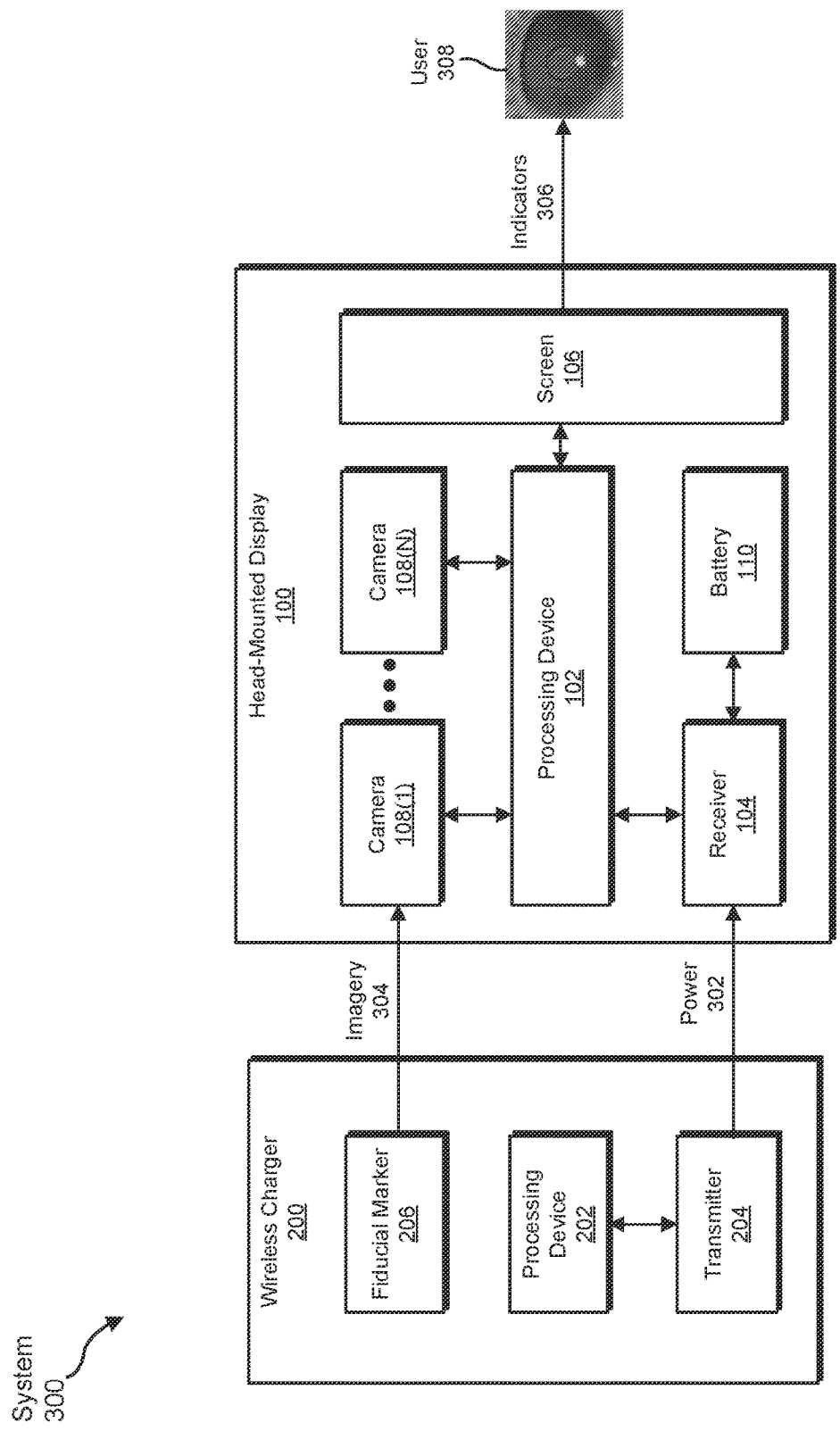
FIG. 3 is an illustration of an exemplary system for interactively and wirelessly charging HMDs according to one or more embodiments of this disclosure.

FIG. 3 illustrates an exemplary system 300 capable of interactively and wirelessly charging HMD 100 via wireless charger 200. In some examples, system 300 may include and/or represent certain devices, configurations, and/or features that perform and/or provide functionalities that are similar and/or identical to those described above in connection with FIG. 1 or 2. As illustrated in FIG. 3, exemplary system 300 may include and/or represent wireless charger 200 and HMD 100 coupled to one another in at least one of several possible ways (e.g., an electromagnetic coupling, an inductive coupling, an optical coupling, an RF or communication coupling, etc.). In one example, such a coupling may be wireless for various reasons (e.g., convenience, visual appeal, durability, longevity, etc.).

In some examples, a user 308 may wear and/or operate HMD 100 in an environment. In such examples, wireless charger 200 may transmit power 302 to HMD 100 via transmitter 204 and/or receiver 104. In one example, HMD 100 may apply power 302 received from wireless charger 200 to charge battery 110. Additionally or alternatively, one or more of cameras 108(1)-(N) may capture and/or record imagery 304 of the environment surrounding user 308.

In some examples, processing device 102 may search for fiducial marker 206 of wireless charger 200 in imagery 304 captured and/or recorded by cameras 108(1)-(N). In one example, processing device 102 may identify and/or detect fiducial marker 206 in imagery 304 during this search. Additionally or alternatively, processing device 102 may identify and/or detect fiducial marker 206 as a wireless beacon signal emanating from wireless charger 200.

In certain implementations, processing device 102 and/or cameras 108(1)-(N) may process imagery 304 to produce and/or extract SLAM data representative of the current position of HMD 100 relative to the surrounding environment and/or fiducial marker 206. Accordingly, processing device 102 and/or cameras 108(1)-(N) may identify and/or detect fiducial marker 206 in and/or relative to the SLAM data. By doing so, processing device 102 may be able to determine, discern, and/or recognize the current position of HMD 100 relative to fiducial marker 206 and/or wireless charger 200 within the surrounding environment. Or put differently, by doing so, processing device 102 may be able to determine, discern, and/or recognize the location of wireless charger 200 relative to the current position of HMD 100 within the environment.

In some examples, processing device 102 may generate and/or obtain power-transfer data corresponding to the amount of power 302 transferred from wireless charger 200 to HMD 100 at a given moment and/or in a certain position. For example, processing device 102, receiver 104, and/or a separate sensor may measure, calculate, and/or extrapolate the amount of power 302 being transferred from wireless charger 200 to HMD 100. In one example, processing device 102 may know the maximum amount of power 302 capable of being transferred from wireless charger 200 to HMD 100 when HMD 100 is optimally positioned relative to wireless charger 200 within the environment. For example, wireless charger 200 may transmit a message indicating the maximum power-transfer capabilities of transmitter 204 to HMD 100. In this example, processing device 102 may generate and/or produce charging-strength information indicating the relative strength of the charging beam received by HMD 100 based at least in part on the amount of power 302 being transferred to HMD 100 and the maximum power-transfer capabilities of wireless charger 200. In certain implementations, charging-strength information may be represented and/or formatted as a percentage and/or percentile of the charging power 302 detected and/or measured by HMD 100 in certain positions.

In some examples, processing device 102 may determine which direction HMD 100 should move to achieve a better and/or more efficient wireless power transfer from wireless charger 200 based at least in part on fiducial marker 206, the SLAM data, the charging-strength information, and/or the power-transfer data. Additionally or alternatively, HMD 100 may transmit the SLAM data, the charging-strength information, and/or the power-transfer data to wireless charger 200 for processing and/or decision-making. For example, processing device 202 may determine which direction HMD 100 should move to achieve a better and/or more efficient wireless power transfer from wireless charger 200 based at least in part on the SLAM data, the charging-strength information, and/or the power-transfer data. In this example, processing device 202 may direct and/or cause wireless charger 200 to transmit a message, instruction, and/or indicator to HMD 100 in response to this determination. Such a message, instruction, and/or indicator may inform HMD 100 of the relative direction (e.g., forward, backward, left, right, etc.) to move to achieve a better and/or more efficient wireless power transfer from wireless charger 200.

In some examples, processing device 102 may generate and/or produce one or more indicators 306 of an effective charging position for HMD 100 relative to a coverage area of wireless charger 200. In these examples, processing device 102 may generate and/or produce indicators 306 based at least in part on fiducial marker 206, the SLAM data, the charging-strength information, and/or the power-transfer data. Additionally and/or alternatively, processing device 102 may generate and/or produce indicators 306 based at least in part on messages, instructions, and/or indicators received from wireless charger 200. Examples of indicators 306 include, without limitation, visual representations of effective charging positions for HMD 100, virtual elements and/or features denoting effective charging positions for HMD 100, maps illustrating effective charging positions for HMD 100 relative to coverage areas of wireless charger 200, visual markers or features indicating where user 308 is to place HMD 100 to achieve and/or facilitate effective charging positions, text-based descriptions or instructions indicating where user 308 is to place HMD 100 to achieve and/or facilitate effective charging positions, audio descriptions and/or instructions intended to guide user 308 to effective charging positions for HMD 100, haptic indicators and/or features imparted to user 308 via HMD 100 or another wearable device, variations or combinations of one or more of the same, and/or any other suitable indicators.

In some examples, processing device 102 may generate and/or produce a visual marker intended to guide user 308 to the effective charging position for HMD 100. In one example, processing device 102 may then provide this visual marker for visual presentation and/or display to user 308 via screen 106. Additionally or alternatively, processing device 102 may generate and/or produce an audio instruction intended to guide user 308 to the effective charging position for HMD 100. In one example, processing device 102 may then provide this audio instruction for audio presentation and/or display to user 308 via a speaker and/or an electroacoustic transducer.

In some examples, processing device 102 or 202 may generate and/or produce a recommendation on where user 308 is to place and/or set wireless charger 200 to achieve the effective charging position for HMD 100. For example, the configuration of the environment in which user 308 is operating HMD 100 may affect and/or alter the power-transfer capabilities of wireless charger 200. In one example, to improve and/or optimize the power-transfer capabilities of wireless charger 200 within that environment, wireless charger 200 and/or HMD 100 may recommend and/or suggest a place and/or location where wireless charger 200 is able to facilitate and/or support a better and/or more efficient wireless power transfer for HMD 100. In this example, wireless charger 200 and/or HMD 100 may base this recommendation and/or suggestion on various considerations, including the SLAM data, the charging-strength information, the power-transfer data, the range of wireless charger 200, and/or the configuration of the environment, among others.

In some examples, wireless charger 200 and/or HMD 100 may provide this recommendation and/or suggestion for presentation to user 308. In such examples, this recommendation and/or suggestion may be represented and/or formatted as a visual feature, a text-based feature, a haptic feature, and/or an audio feature. For example, HMD 100 may provide a visual feature for visual presentation to user 308 via screen 106. In this example, the visual feature may indicate where user 308 is to place and/or set wireless charger 200 to facilitate and/or support the effective charging position for HMD 100. Additionally or alternatively, wireless charger 200 and/or HMD 100 may provide an audio feature for audio presentation to user 308. In this example, the audio feature may indicate where user 308 is to place and/or set wireless charger 200 to facilitate and/or support the effective charging position for HMD 100.

Figure 4:
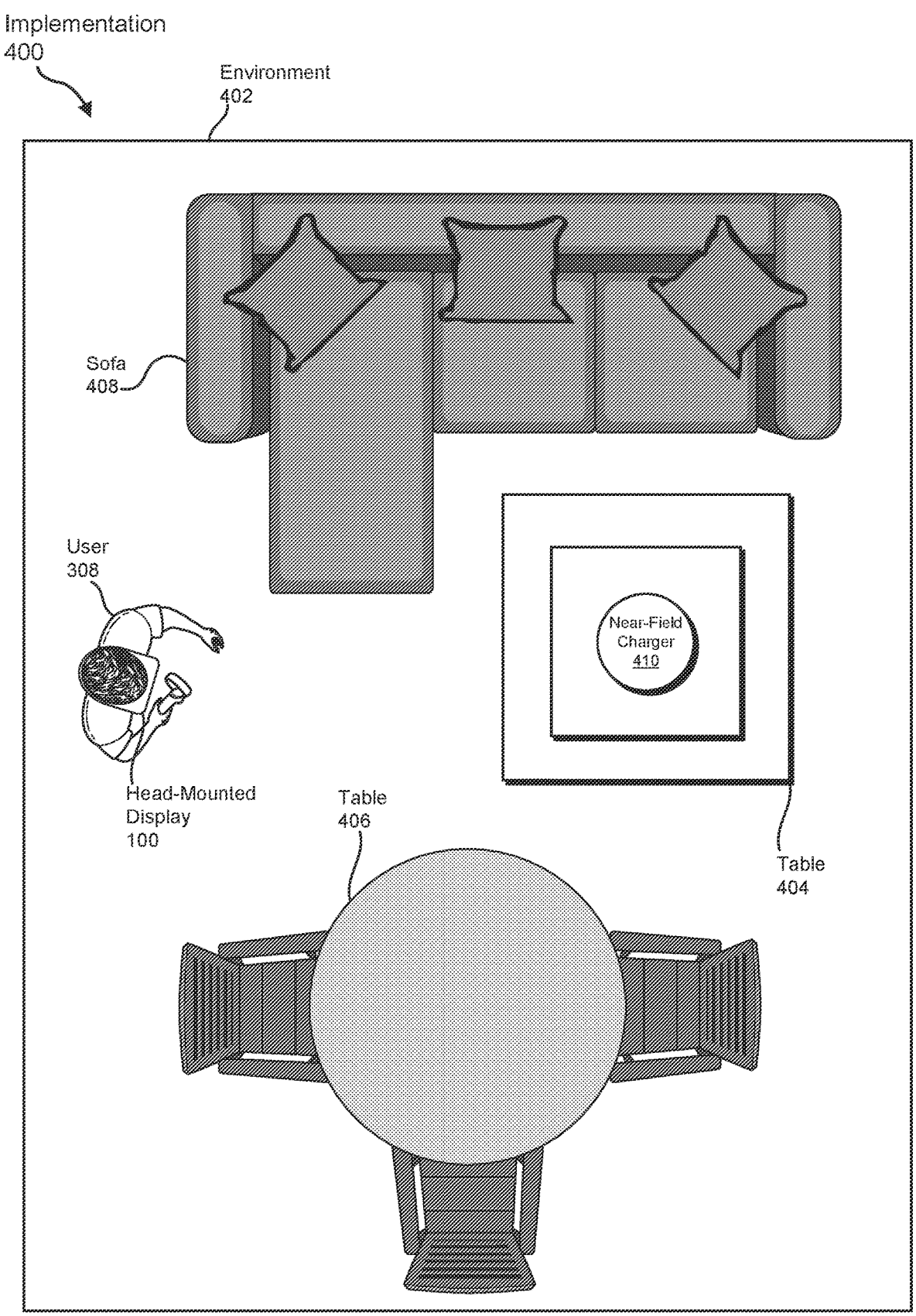
FIG. 4 is an illustration of an exemplary implementation of a system for interactively and wirelessly charging HMDs according to one or more embodiments of this disclosure.

FIG. 4 illustrates an exemplary implementation 400 of a system involving HMD 100 and near-field charger 410. In some examples, implementation 400 may include and/or involve certain devices, configurations, and/or features that perform and/or provide functionalities that are similar and/or identical to those described above in connection with any of FIGS. 1-3. As illustrated in FIG. 4, exemplary implementation 400 may include and/or involve user 308 wearing and/or operating HMD 100 in an environment 402. In one example, environment 402 may include and/or represent all or a portion of a room equipped and/or decorated with various pieces of furniture, such as a table 404, a table 406, and/or a sofa 408, among others.

In some examples, near-field charger 410 may be invisibly installed and/or integrated into table 404. In one example, while the user wears and/or operates HMD 100, the charge of battery 110 may dip and/or drop below a certain threshold. As a result, HMD 100 may notify user 308 that battery 110 is low and/or needs to be charged. Additionally or alternatively, user 308 may provide and/or enter user input indicating a desire to charge HMD 100 and/or requesting an indicator corresponding to an effective charging position for HMD 100. Examples of such user input include, without limitation, pressing one or more buttons on HMD 100 or a connected controller, providing a spoken indication of the user's desire and/or request to HMD 100, performing a gesture and/or symbol that HMD 100 interprets as an indication of the user's desire and/or request, variations or combinations of one or more of the same, and/or any other suitable user input.

In response to such user input, HMD 100 may determine and/or identify the coverage area of near-field charger 410 relative to the current position of HMD 100. In some examples, HMD 100 may do so based at least in part on SLAM data captured and/or recorded via cameras 108(1)-(N) and/or a fiducial marker of near-field charger 410. In one example, HMD 100 may present and/or display an indicator to user 308 via screen 106. In this example, the indicator may notify and/or inform user 308 of an effective charging position for HMD 100 relative to the current position of HMD 100. For example, the indicator may direct and/or instruct user 308 to place and/or set HMD 100 atop the center of table 404 so that near-field charger 410 is able to wirelessly charge battery 110. User 308 may then place and/or set HMD 100 atop the center of table 404 accordingly.

Figure 5:
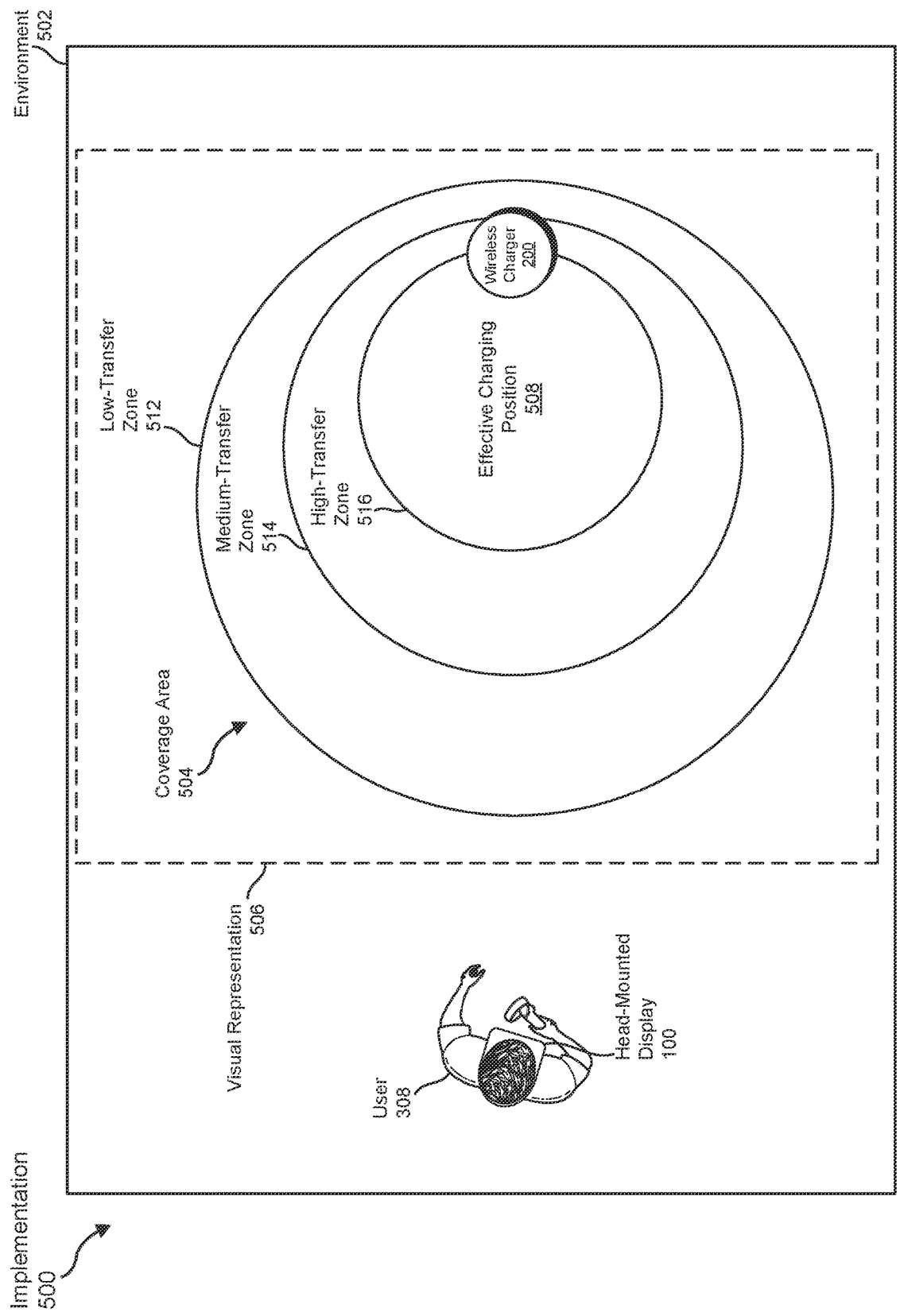
FIG. 5 is an illustration of an exemplary implementation of a system for interactively and wirelessly charging HMDs according to one or more embodiments of this disclosure.

FIG. 5 illustrates an exemplary implementation 500 of system 300 involving HMD 100 and wireless charger 200. In some examples, implementation 500 may include and/or involve certain devices, configurations, and/or features that perform and/or provide functionalities that are similar and/or identical to those described above in connection with any of FIGS. 1-4. As illustrated in FIG. 5, exemplary implementation 500 may include and/or involve user 308 wearing and/or operating HMD 100 in an environment 502. In one example, like environment 402 in FIG. 4, environment 502 may include and/or represent all or a portion of a room equipped and/or decorated with various pieces of furniture (not necessarily illustrated in FIG. 5).

In some examples, charger 200 may be installed and/or placed several feet away from user 308 and/or HMD 100 within environment 502. In one example, HMD 100 may determine and/or identify coverage area 504 of wireless charger 200 relative to the current position of HMD 100. HMD 100 may do so based at least in part on SLAM data captured and/or recorded via cameras 108(1)-(N), fiducial marker 206, charging-strength information, and/or power-transfer data. In this example, HMD 100 may present and/or display an indicator in connection with coverage area 504 to user 308 via screen 106.

In some examples, the indicator may include and/or represent a visual representation 506 of coverage area 504. As a specific example, visual representation 506 may include and/or represent a map illustrating coverage area 504 as a plurality of charging zones. For example, the map may illustrate and/or identify coverage area 504 as consisting of a high-transfer zone 516, a medium-transfer zone 514, and/or a low-transfer zone 512. In this example, high-transfer zone 616 may include and/or represent the area in which wireless charger 200 is able to transfer the most power to HMD 100, and low-transfer zone 512 may include and/or represent the area in which wireless charger 200 is able to transfer the least power to HMD 100. Accordingly, medium-transfer zone 514 may include and/or represent an area in which wireless charger 200 is able to transfer more power to HMD 100 than in low-transfer zone 512 but less power to HMD 100 than in high-transfer zone 516.

In one example, the map may differentiate and/or distinguish high-transfer zone 516, medium-transfer zone 514, and/or low-transfer zone 512 in a variety of ways. For example, the different zones of coverage area 504 may be presented and/or displayed in different colors and/or with different labels to indicate their respective spans, ranges, and/or charging potentials. In certain implementations, high-transfer zone 516 may constitute and/or represent an effective charging position 508 for HMD 100. Accordingly, HMD 100 may direct and/or instruct user 308 to place HMD 100 in high-transfer zone 516 to achieve, engage, and/or take advantage of the optimal charging potential of wireless charger 200.

Figure 6:
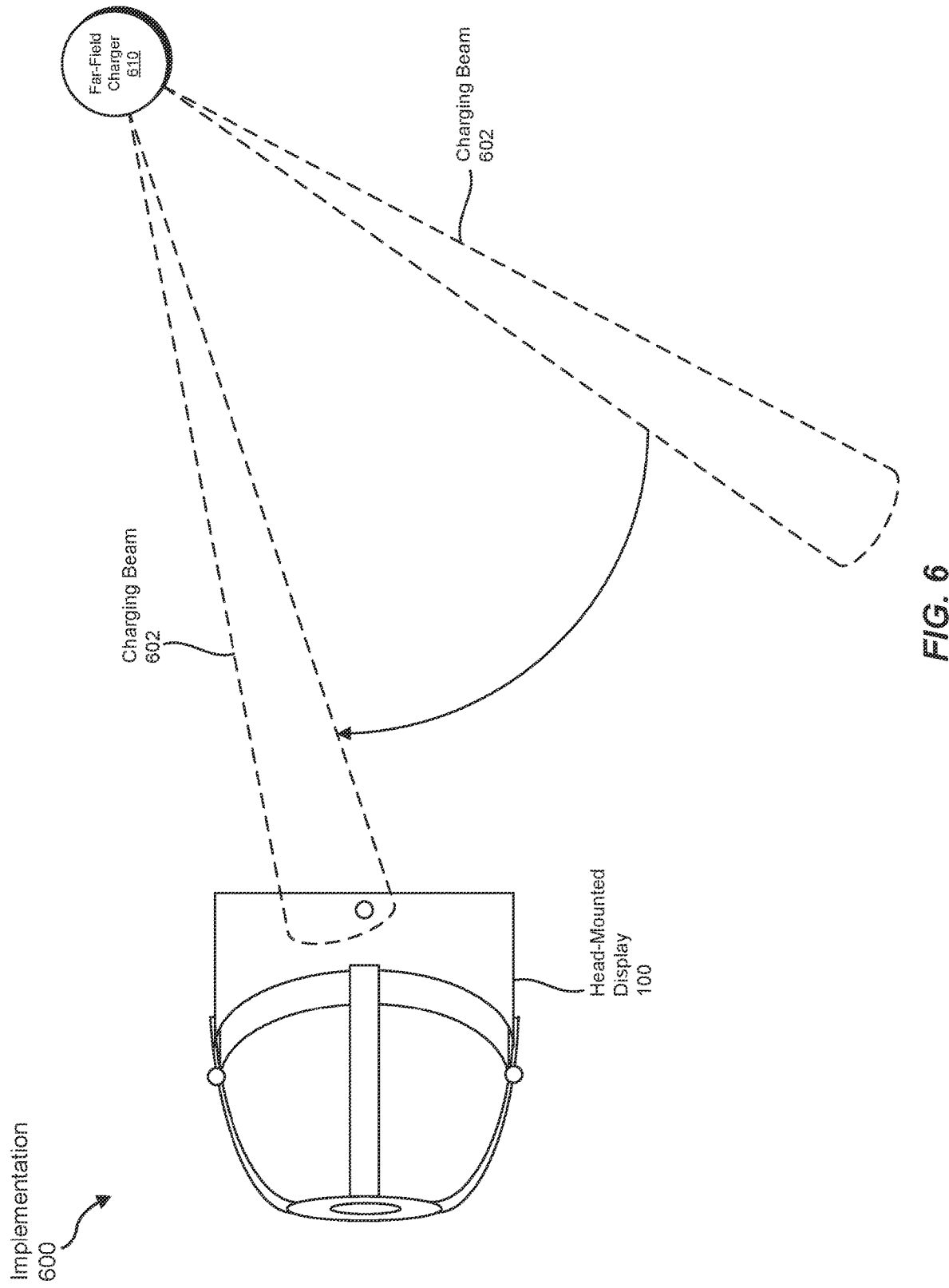
FIG. 6 is an illustration of an exemplary implementation of a system for interactively and wirelessly charging HMDs according to one or more embodiments of this disclosure.

FIG. 6 illustrates an exemplary implementation 600 of a system involving HMD 100 and a far-field charger 610. In some examples, implementation 600 may include and/or involve certain devices, configurations, and/or features that perform and/or provide functionalities that are similar and/or identical to those described above in connection with any of FIGS. 1-5. As illustrated in FIG. 6, exemplary implementation 600 may include and/or involve HMD 100 being wirelessly charged by far-field charger 610 via a charging beam 602. In one example, charging beam 602 may be directional and/or steerable by far-field charger 610.

In some examples, far-field charger 610 may determine and/or identify the current position of HMD 100 relative to the location of far-field charger 610. In one example, far-field charger 610 may do so based at least in part on SLAM data obtained from HMD 100, charging-strength information, and/or power-transfer data. Additionally or alternatively, far-field charger 610 may determine and/or identify the direction in which charging beam 602 is currently aimed and/or focused. In this example, far-field charger 610 may determine and/or discover that HMD 100 is currently positioned away from the direction in which charging beam 602 is aimed and/or focused. In response, far-field charger 610 may redirect and/or steer charging beam 602 toward the current position of HMD 100 so that charging beam 602 is able to transfer power more efficiently and/or effectively to HMD 100.

Figure 7:
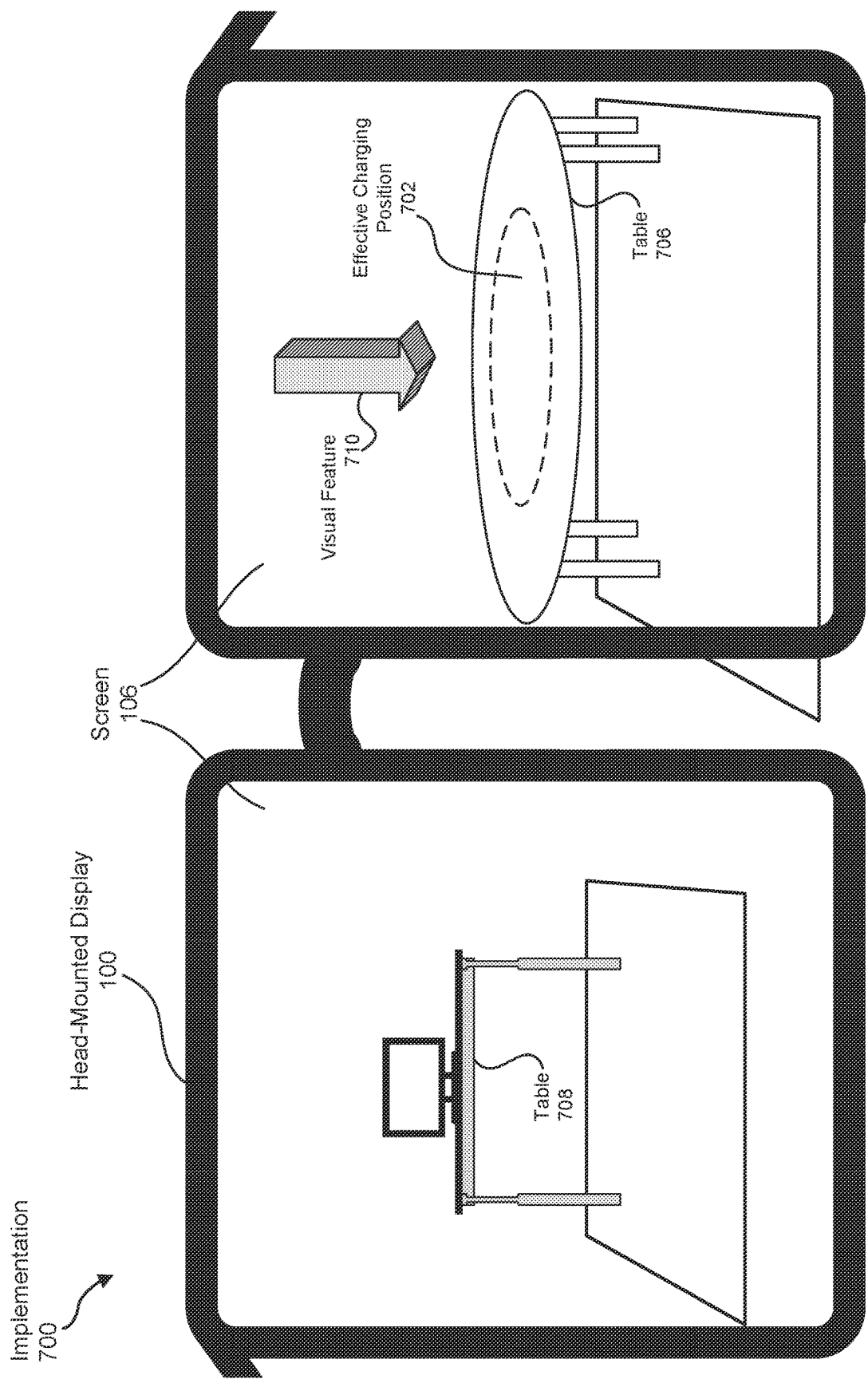
FIG. 7 is an illustration of an exemplary implementation of a system for interactively and wirelessly charging HMDs according to one or more embodiments of this disclosure.

FIG. 7 illustrates an exemplary implementation 700 of a system involving HMD 100 and a near-field charger from the perspective of a user wearing HMD 100. Accordingly, FIG. 7 may illustrate implementation 700 from the point of view of the user wearing HMD 100. In some examples, implementation 700 may include and/or involve certain devices, configurations, and/or features that perform and/or provide functionalities that are similar and/or identical to those described above in connection with any of FIGS. 1-6. As illustrated in FIG. 7, exemplary implementation 700 may include and/or involve the user wearing and/or operating HMD 100 in a room equipped and/or decorated with certain pieces of furniture. In one example, the near-field charger may be invisibly installed and/or integrated into a table 706.

In some examples, HMD 100 may determine and/or identify the coverage area of the near-field charger relative to the current position of HMD 100. In such examples, HMD 100 may do so based at least in part on SLAM data captured and/or recorded via cameras 108(1)-(N), a fiducial marker of the near-field charger, charging-strength information, and/or power-transfer data. In one example, HMD 100 may present and/or display a visual feature 710 to the user via screen 106. In this example, visual feature 710 may include and/or represent an arrow notifying and/or informing the user of an effective charging position 702 for HMD 100. In certain implementations, the arrow may direct and/or instruct the user to place and/or set HMD 100 atop table 706 so that the near-field charger is able to wirelessly charge HMD 100 in effective charging position 702. The user may then place and/or set HMD 100 atop the center of table 404 accordingly.

In some examples, screen 106 may include and/or represent lenses that facilitate and/or support see-through visibility with superimposed virtual overlays. In one example, HMD 100 may superimpose visual feature 710 as a virtual component over certain real components visible through screen 106. For example, implementation 700 may depict a real-world environment that includes table 706 and a table 708 as seen by the user via HMD 100. However, implementation 700 may also depict visual feature 710 as a virtual component that does not exist in the real-world environment.

In some examples, the various devices and systems described in connection with FIGS. 1-7 may include and/or represent one or more additional circuits, components, and/or features that are not necessarily illustrated and/or labeled in FIGS. 1-7. For example, HMD 100 and/or wireless charger 200 may also include and/or represent additional analog and/or digital circuitry, onboard logic, transistors, RF transmitters, RF receivers, transceivers, antennas, resistors, capacitors, diodes, inductors, switches, registers, flipflops, connections, traces, buses, semiconductor (e.g., silicon) devices and/or structures, processing devices, storage devices, circuit boards, sensors, packages, substrates, housings, combinations or variations of one or more of the same, and/or any other suitable components that facilitate and/or support interactive wireless charging of HMDs. In certain implementations, one or more of these additional circuits, components, and/or features may be inserted and/or applied between any of the existing circuits, components, and/or features illustrated in FIGS. 1-7 consistent with the aims and/or objectives described herein. Accordingly, the electrical and/or communicative couplings described with reference to FIGS. 1-7 may be direct connections with no intermediate components, devices, and/or nodes or indirect connections with one or more intermediate components, devices, and/or nodes.

In some examples, the phrase "to couple" and/or the term "coupling", as used herein, may refer to a direct connection and/or an indirect connection. For example, a direct coupling between two components may constitute and/or represent a coupling in which those two components are directly connected to each other by a single node that provides electrical continuity from one of those two components to the other. In other words, the direct coupling may exclude and/or omit any additional components between those two components.

Additionally or alternatively, an indirect coupling between two components may constitute and/or represent a coupling in which those two components are indirectly connected to each other by multiple nodes that fail to provide electrical continuity from one of those two components to the other. In other words, the indirect coupling may include and/or incorporate at least one additional component between those two components.

Figure 8:
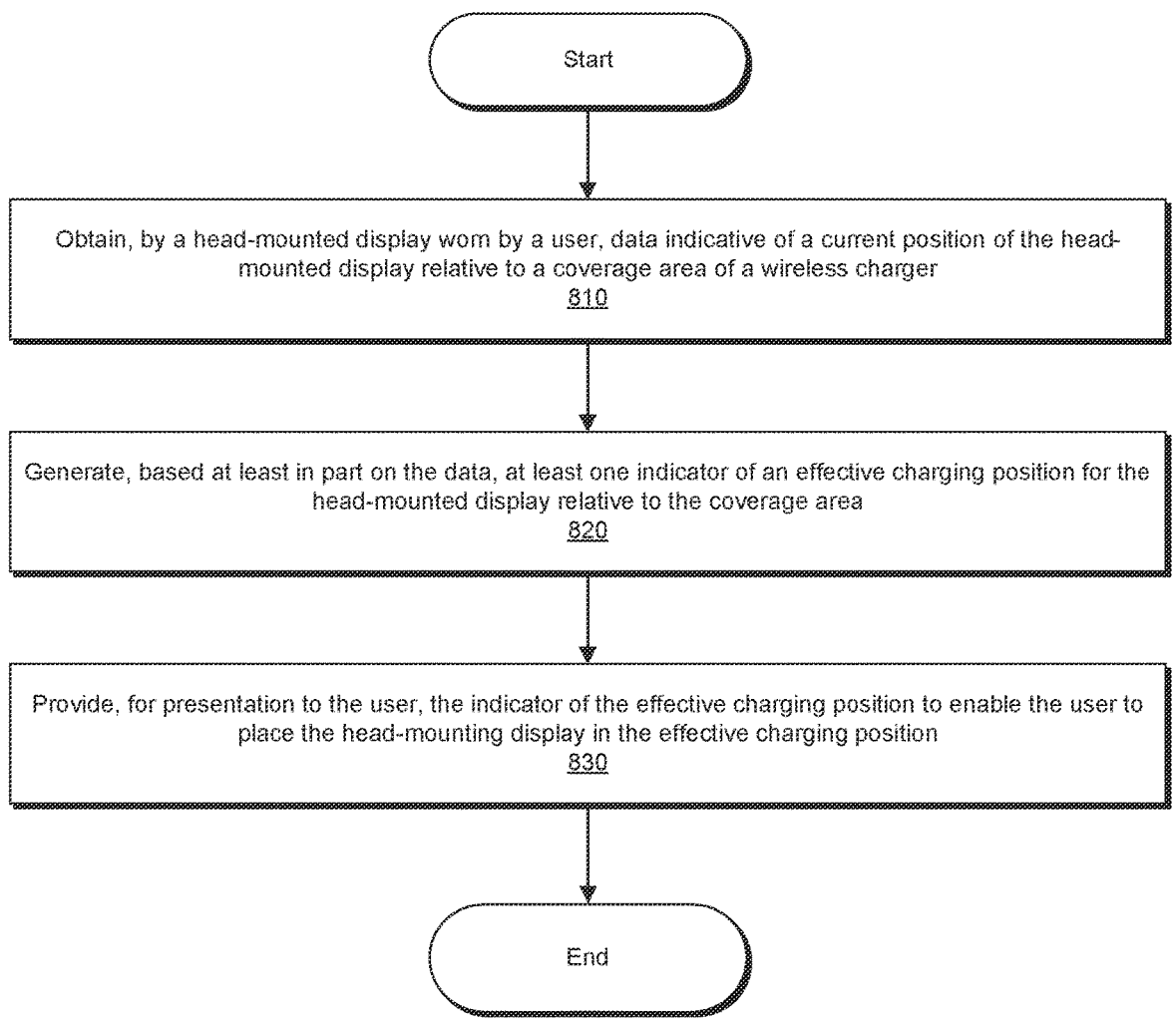
FIG. 8 is a flowchart of an exemplary method for interactively and wirelessly charging HMDs according to one or more embodiments of this disclosure.

FIG. 8 is a flow diagram of an exemplary method 800 for interactive wireless charging of HMDs. In one example, the steps shown in FIG. 8 may be performed during operation of an artificial-reality system. Additionally or alternatively, the steps shown in FIG. 8 may also incorporate and/or involve various sub-steps and/or variations consistent with the descriptions provided above in connection with FIGS. 1-7.

As illustrated in FIG. 8, method 800 may include and/or involve the step of obtaining, by an HMD worn by a user, data indicative of a current position of the HMD relative to a coverage area of a wireless charger (810). Step 810 may be performed in a variety of ways, including any of those described above in connection with FIGS. 1-7. For example, an HMD worn by a user may generate and/or obtain data indicative of a current position of the HMD relative to the coverage area of a wireless charger.

Method 800 may also include and/or involve the step of generating, based at least in part on the data, at least one indicator of an effective charging position for the HMD relative to the coverage area (820). Step 820 may be performed in a variety of ways, including any of those described above in connection with FIGS. 1-7. For example, the HMD may generate and/or produce at least one indicator of an effective charging position for the HMD relative to the coverage area. In this example, the HMD may do so based at least in part on the data.

Method 800 may further include and/or involve the step of providing, for presentation to the user, the indicator of the effective charging position to enable the user to place the HMD in the effective charging position (830). Step 830 may be performed in a variety of ways, including any of those described above in connection with FIGS. 1-7. For example, the HMD may provide the indicator of the effective charging position for presentation to the user. In this example, by doing so, the HMD may enable the user to place the HMD in the effective charging position.

Example Embodiments

Example 1: A system comprising (1) a wireless charger configured to wirelessly transfer power within a coverage area, (2) an HMD dimensioned to be worn by a user, wherein the HMD is configured to obtain data indicative of a current position of the HMD relative to the coverage area, and (3) at least one processing device configured to provide at least one indicator of an effective charging position for the HMD relative to the coverage area based at least in part on the data.

Example 2: The system of Example 1, wherein (1) the processing device is incorporated into the HMD, and (2) the HMD is further configured to provide the indicator of the effective charging position for presentation to the user.

Example 3: The system of Example 1 or 2, wherein (1) the indicator of the effective charging position comprises a visual representation of the effective charging position relative to the coverage area, and (2) the HMD is further configured to provide the visual representation of the effective charging position for visual presentation to the user.

Example 4: The system of any of Examples 1-3, wherein the visual representation comprises at least one of (1) a map that illustrates the effective charging position relative to the coverage area or (2) a visual marker that indicates where the user is to place the HMD to achieve the effective charging position.

Example 5: The system of any of Examples 1-4, wherein the map illustrates a plurality of charging zones within the coverage area, the charging zones comprising at least one of (1) a first charging zone or (2) a second charging zone that is more effective than the first charging zone.

Example 6: The system of any of Examples 1-5, wherein the data comprises at least one of (1) simultaneous localization and mapping (SLAM) data that corresponds to the current position of the HMD or (2) power-transfer data that represents an amount of power transferred by the wireless charger to the HMD in the current position.

Example 7: The system of any of Examples 1-6, wherein (1) the wireless charger is configured to provide a fiducial marker to the HMD, and (2) the SLAM data accounts for the fiducial marker.

Example 8: The system of any of Examples 1-7, wherein the fiducial marker comprises at least one of (1) a physical feature that indicates a location of the wireless charger; or (2) a beacon that indicates a location of the wireless charger.

Example 9: The system of any of Examples 1-8, wherein the wireless charger comprises a near-field charger that is hidden from view of the HMD.

Example 10: The system of any of Examples 1-9, wherein (1) the wireless charger comprises a far-field charger configured to wirelessly transmits a charging beam, (2) the processing device is incorporated into the far-field charger, and (3) the wireless charger is further configured to modify the charging beam to achieve the effective charging position for the HMD based at least in part on the indicator.

Example 11: The system of any of Examples 1-10, wherein the wireless charger is configured to modify the charging beam by at least one of (1) steering the charging beam of the far-field charger to the effective charging position for the HMD based at least in part on the indicator or (2) changing at least one setting of the far-field charger to alter a charging beam of the far-field charger for the effective charging position for the HMD.

Example 12: The system of any of Examples 1-11, wherein the processing device is further configured to direct the wireless charger or the HMD to provide, for presentation to the user, a recommendation on where the user is to place the wireless charger to achieve the effective charging position based at least in part on the indicator.

Example 13: The system of any of Examples 1-12, wherein (1) the recommendation comprises a visual feature indicating where the user is to place the wireless charger to achieve the effective charging position, (2) the processing device is incorporated into the HMD, and (3) the HMD is further configured to provide the visual feature for visual presentation to the user.

Example 14: An HMD comprising (1) at least one camera configured to capture imagery of a surrounding environment, (2) a wireless receiver configured to receive, from a wireless charger located in the surrounding environment, power to charge a battery, and (3) at least one processing device configured to (A) generate at least one indicator of an effective charging position relative to the coverage area based at least in part on the imagery and (B) provide the indicator of the effective charging position for presentation to a user.

Example 15: The HMD of Example 14, wherein (1) the indicator of the effective charging position comprises a visual representation of the effective charging position relative to the coverage area, and (2) the HMD is further configured to provide the visual representation of the effective charging position for visual presentation to the user.

Example 16: The HMD of Example 14 or 15, wherein the visual representation comprises at least one of (1) a map that illustrates the effective charging position relative to the coverage area, or (2) a visual marker that indicates where the user is to place the HMD to achieve the effective charging position.

Example 17: The HMD of any of Examples 14-16, wherein the map illustrates a plurality of charging zones within the coverage area, the charging zones comprising at least one of (1) a first charging zone or (2) a second charging zone that is more effective than the first charging zone.

Example 18: The HMD of any of Examples 14-17, wherein (1) the imagery is represented as simultaneous localization and mapping (SLAM) data, and (2) the processing device is further configured to generate the indicator of the effective charging position based at least in part on the SLAM data.

Example 19: The HMD of any of Examples 14-18, wherein the processing device is further configured to (1) identify an amount of power received by the wireless receiver from the wireless charger and (2) generate the indicator of the effective charging position based at least in part on the imagery and the amount of power received by the wireless receiver.

Example 20: A method comprising (1) obtaining, by an HMD worn by a user, data indicative of a current position of the HMD relative to a coverage area of a wireless charger, (2) generating, based at least in part on the data, at least one indicator of an effective charging position for the HMD relative to the coverage area, and (3) providing, for presentation to the user, the indicator of the effective charging position to enable the user to place the HMD in the effective charging position.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented reality system 900 in FIG. 9) or that visually immerses a user in an artificial reality (such as, e.g., virtual-reality system 1000 in FIG. 10). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 9:
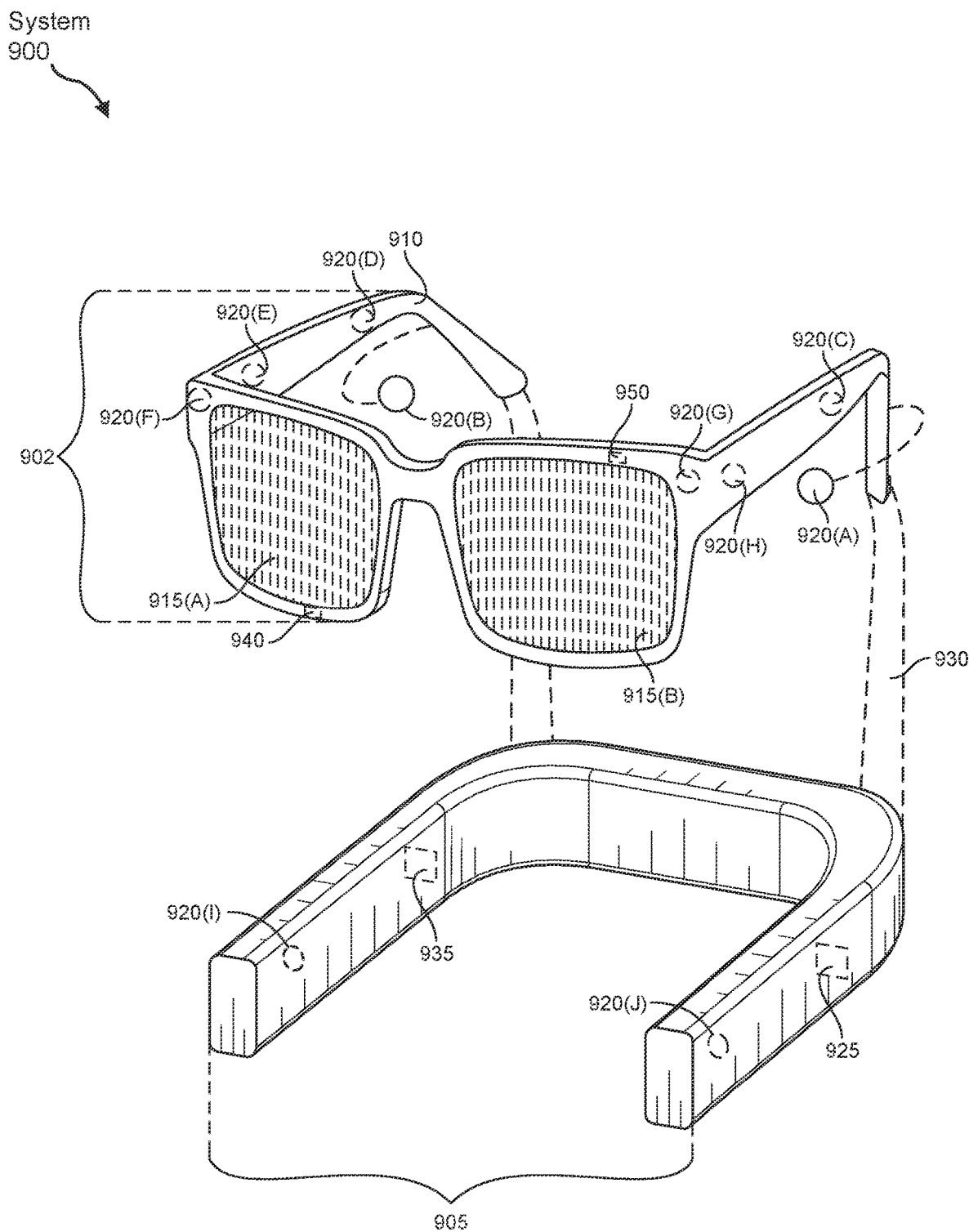
FIG. 9 is an illustration of exemplary augmented-reality glasses that may be used in connection with embodiments of this disclosure.

Turning to FIG. 9, augmented-reality system 900 may include an eyewear device 902 with a frame 910 configured to hold a left display device 915(A) and a right display device 915(B) in front of a user's eyes. Display devices 915(A) and 915(B) may act together or independently to present an image or series of images to a user. While augmented-reality system 900 includes two displays, embodiments of this disclosure may be implemented in augmented-reality systems with a single NED or more than two NEDs.

In some embodiments, augmented-reality system 900 may include one or more sensors, such as sensor 940. Sensor 940 may generate measurement signals in response to motion of augmented-reality system 900 and may be located on substantially any portion of frame 910. Sensor 940 may represent one or more of a variety of different sensing mechanisms, such as a position sensor, an inertial measurement unit (IMU), a depth camera assembly, a structured light emitter and/or detector, or any combination thereof. In some embodiments, augmented-reality system 900 may or may not include sensor 940 or may include more than one sensor. In embodiments in which sensor 940 includes an IMU, the IMU may generate calibration data based on measurement signals from sensor 940. Examples of sensor 940 may include, without limitation, accelerometers, gyroscopes, magnetometers, other suitable types of sensors that detect motion, sensors used for error correction of the IMU, or some combination thereof.

In some examples, augmented-reality system 900 may also include a microphone array with a plurality of acoustic transducers 920(A)-920(J), referred to collectively as acoustic transducers 920. Acoustic transducers 920 may represent transducers that detect air pressure variations induced by sound waves. Each acoustic transducer 920 may be configured to detect sound and convert the detected sound into an electronic format (e.g., an analog or digital format). The microphone array in FIG. 9 may include, for example, ten acoustic transducers: 920(A) and 920(B), which may be designed to be placed inside a corresponding ear of the user, acoustic transducers 920(C), 920(D), 920(E), 920(F), 920(G), and 920(H), which may be positioned at various locations on frame 910, and/or acoustic transducers 920(I) and 920(J), which may be positioned on a corresponding neckband 905.

In some embodiments, one or more of acoustic transducers 920(A)-(J) may be used as output transducers (e.g., speakers). For example, acoustic transducers 920(A) and/or 920(B) may be earbuds or any other suitable type of headphone or speaker.

The configuration of acoustic transducers 920 of the microphone array may vary. While augmented-reality system 900 is shown in FIG. 9 as having ten acoustic transducers 920, the number of acoustic transducers 920 may be greater or less than ten. In some embodiments, using higher numbers of acoustic transducers 920 may increase the amount of audio information collected and/or the sensitivity and accuracy of the audio information. In contrast, using a lower number of acoustic transducers 920 may decrease the computing power required by an associated controller 950 to process the collected audio information. In addition, the position of each acoustic transducer 920 of the microphone array may vary. For example, the position of an acoustic transducer 920 may include a defined position on the user, a defined coordinate on frame 910, an orientation associated with each acoustic transducer 920, or some combination thereof.

Acoustic transducers 920(A) and 920(B) may be positioned on different parts of the user's ear, such as behind the pinna, behind the tragus, and/or within the auricle or fossa. Or, there may be additional acoustic transducers 920 on or surrounding the ear in addition to acoustic transducers 920 inside the ear canal. Having an acoustic transducer 920 positioned next to an ear canal of a user may enable the microphone array to collect information on how sounds arrive at the ear canal. By positioning at least two of acoustic transducers 920 on either side of a user's head (e.g., as binaural microphones), augmented-reality system 900 may simulate binaural hearing and capture a 3D stereo sound field around about a user's head. In some embodiments, acoustic transducers 920(A) and 920(B) may be connected to augmented-reality system 900 via a wired connection 930, and in other embodiments acoustic transducers 920(A) and 920(B) may be connected to augmented-reality system 900 via a wireless connection (e.g., a BLUETOOTH connection). In still other embodiments, acoustic transducers 920(A) and 920(B) may not be used at all in conjunction with augmented reality system 900.

Acoustic transducers 920 on frame 910 may be positioned in a variety of different ways, including along the length of the temples, across the bridge, above or below display devices 915(A) and 915(B), or some combination thereof. Acoustic transducers 920 may also be oriented such that the microphone array is able to detect sounds in a wide range of directions surrounding the user wearing the augmented-reality system 900. In some embodiments, an optimization process may be performed during manufacturing of augmented-reality system 900 to determine relative positioning of each acoustic transducer 920 in the microphone array.

In some examples, augmented-reality system 900 may include or be connected to an external device (e.g., a paired device), such as neckband 905. Neckband 905 generally represents any type or form of paired device. Thus, the following discussion of neckband 905 may also apply to various other paired devices, such as charging cases, smart watches, smart phones, wrist bands, other wearable devices, hand-held controllers, tablet computers, laptop computers, other external compute devices, etc.

As shown, neckband 905 may be coupled to eyewear device 902 via one or more connectors. The connectors may be wired or wireless and may include electrical and/or non-electrical (e.g., structural) components. In some cases, eyewear device 902 and neckband 905 may operate independently without any wired or wireless connection between them. While FIG. 9 illustrates the components of eyewear device 902 and neckband 905 in example locations on eyewear device 902 and neckband 905, the components may be located elsewhere and/or distributed differently on eyewear device 902 and/or neckband 905. In some embodiments, the components of eyewear device 902 and neckband 905 may be located on one or more additional peripheral devices paired with eyewear device 902, neckband 905, or some combination thereof.

Pairing external devices, such as neckband 905, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 900 may be provided by a paired device or shared between a paired device and an eyewear device, thus reducing the weight, heat profile, and form factor of the eyewear device overall while still retaining desired functionality. For example, neckband 905 may allow components that would otherwise be included on an eyewear device to be included in neckband 905 since users may tolerate a heavier weight load on their shoulders than they would tolerate on their heads. Neckband 905 may also have a larger surface area over which to diffuse and disperse heat to the ambient environment. Thus, neckband 905 may allow for greater battery and computation capacity than might otherwise have been possible on a stand-alone eyewear device. Since weight carried in neckband 905 may be less invasive to a user than weight carried in eyewear device 902, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 905 may be communicatively coupled with eyewear device 902 and/or to other devices. These other devices may provide certain functions (e.g., tracking, localizing, depth mapping, processing, storage, etc.) to augmented-reality system 900. In the embodiment of FIG. 9, neckband 905 may include two acoustic transducers (e.g., 920(I) and 920(J)) that are part of the microphone array (or potentially form their own microphone subarray). Neckband 905 may also include a controller 925 and a power source 935.

Acoustic transducers 920(I) and 920(J) of neckband 905 may be configured to detect sound and convert the detected sound into an electronic format (analog or digital). In the embodiment of FIG. 9, acoustic transducers 920(I) and 920(J) may be positioned on neckband 905, thereby increasing the distance between the neckband acoustic transducers 920(I) and 920(J) and other acoustic transducers 920 positioned on eyewear device 902. In some cases, increasing the distance between acoustic transducers 920 of the microphone array may improve the accuracy of beamforming performed via the microphone array. For example, if a sound is detected by acoustic transducers 920(C) and 920(D) and the distance between acoustic transducers 920(C) and 920 (D) is greater than, e.g., the distance between acoustic transducers 920(D) and 920(E), the determined source location of the detected sound may be more accurate than if the sound had been detected by acoustic transducers 920(D) and 920(E).

Controller 925 of neckband 905 may process information generated by the sensors on neckband 905 and/or augmented-reality system 900. For example, controller 925 may process information from the microphone array that describes sounds detected by the microphone array. For each detected sound, controller 925 may perform a direction-of-arrival (DOA) estimation to estimate a direction from which the detected sound arrived at the microphone array. As the microphone array detects sounds, controller 925 may populate an audio data set with the information. In embodiments in which augmented-reality system 900 includes an inertial measurement unit, controller 925 may compute all inertial and spatial calculations from the IMU located on eyewear device 902. A connector may convey information between augmented-reality system 900 and neckband 905 and between augmented-reality system 900 and controller 925. The information may be in the form of optical data, electrical data, wireless data, or any other transmittable data form. Moving the processing of information generated by augmented-reality system 900 to neckband 905 may reduce weight and heat in eyewear device 902, making it more comfortable to the user.

Power source 935 in neckband 905 may provide power to eyewear device 902 and/or to neckband 905. Power source 935 may include, without limitation, lithium ion batteries, lithium-polymer batteries, primary lithium batteries, alkaline batteries, or any other form of power storage. In some cases, power source 935 may be a wired power source. Including power source 935 on neckband 905 instead of on eyewear device 902 may help better distribute the weight and heat generated by power source 935.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1000 in FIG. 10, that mostly or completely covers a user's field of view. Virtual-reality system 1000 may include a front rigid body 1002 and a band 1004 shaped to fit around a user's head. Virtual-reality system 1000 may also include output audio transducers 1006(A) and 1006(B). Furthermore, while not shown in FIG. 10, front rigid body 1002 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 900 and/or virtual-reality system 1000 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 900 and/or virtual-reality system 1000 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 900 and/or virtual-reality system 1000 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

Some augmented-reality systems may map a user's and/or device's environment using techniques referred to as "simultaneous location and mapping" (SLAM). SLAM mapping and location identifying techniques may involve a variety of hardware and software tools that can create or update a map of an environment while simultaneously keeping track of a user's location within the mapped environment. SLAM may use many different types of sensors to create a map and determine a user's position within the map.

SLAM techniques may, for example, implement optical sensors to determine a user's location. Radios including WiFi, BLUETOOTH, global positioning system (GPS), cellular or other communication devices may be also used to determine a user's location relative to a radio transceiver or group of transceivers (e.g., a WiFi router or group of GPS satellites). Acoustic sensors such as microphone arrays or 2D or 3D sonar sensors may also be used to determine a user's location within an environment. Augmented-reality and virtual-reality devices (such as systems 900 and 1000 of FIGS. 9 and 10, respectively) may incorporate any or all of these types of sensors to perform SLAM operations such as creating and continually updating maps of the user's current environment. In at least some of the embodiments described herein, SLAM data generated by these sensors may be referred to as "environmental data" and may indicate a user's current environment. This data may be stored in a local or remote data store (e.g., a cloud data store) and may be provided to a user's AR/VR device on demand.

As noted, artificial-reality systems 900 and 1000 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 11:
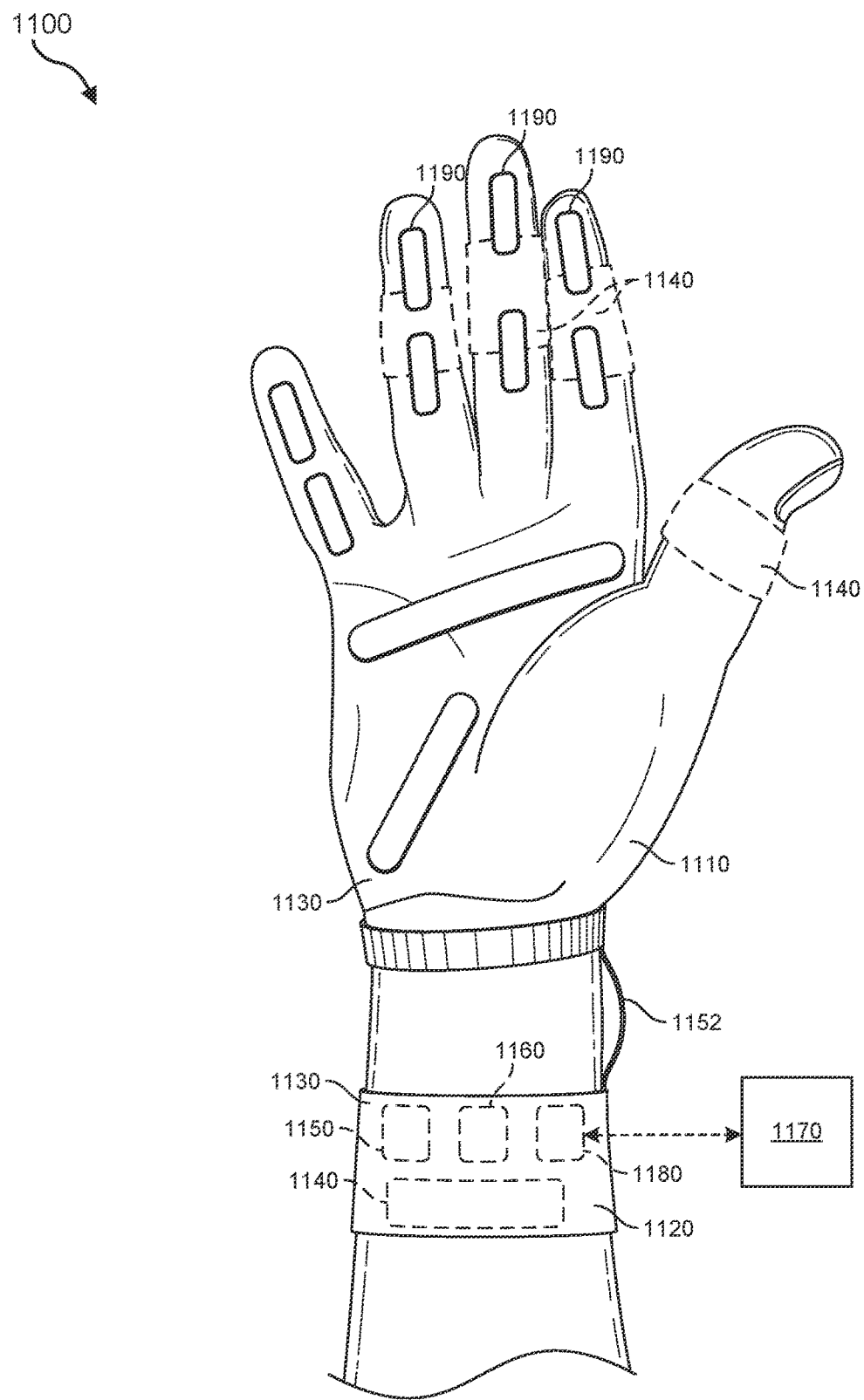
FIG. 11 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 11 illustrates a vibrotactile system 1100 in the form of a wearable glove (haptic device 1110) and wristband (haptic device 1120). Haptic device 1110 and haptic device 1120 are shown as examples of wearable devices that include a flexible, wearable textile material 1130 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, nonwoven fabric, leather, cloth, a flexible polymer material, composite materials, etc.

One or more vibrotactile devices 1140 may be positioned at least partially within one or more corresponding pockets formed in textile material 1130 of vibrotactile system 1100. Vibrotactile devices 1140 may be positioned in locations to provide a vibrating sensation (e.g., haptic feedback) to a user of vibrotactile system 1100. For example, vibrotactile devices 1140 may be positioned against the user's finger(s), thumb, or wrist, as shown in FIG. 11. Vibrotactile devices 1140 may, in some examples, be sufficiently flexible to conform to or bend with the user's corresponding body part(s).

A power source 1150 (e.g., a battery) for applying a voltage to the vibrotactile devices 1140 for activation thereof may be electrically coupled to vibrotactile devices 1140, such as via conductive wiring 1152. In some examples, each of vibrotactile devices 1140 may be independently electrically coupled to power source 1150 for individual activation. In some embodiments, a processor 1160 may be operatively coupled to power source 1150 and configured (e.g., programmed) to control activation of vibrotactile devices 1140.

Vibrotactile system 1100 may be implemented in a variety of ways. In some examples, vibrotactile system 1100 may be a standalone system with integral subsystems and components for operation independent of other devices and systems. As another example, vibrotactile system 1100 may be configured for interaction with another device or system 1170. For example, vibrotactile system 1100 may, in some examples, include a communications interface 1180 for receiving and/or sending signals to the other device or system 1170. The other device or system 1170 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 1180 may enable communications between vibrotactile system 1100 and the other device or system 1170 via a wireless (e.g., Wi-Fi, BLUETOOTH, cellular, radio, etc.) link or a wired link. If present, communications interface 1180 may be in communication with processor 1160, such as to provide a signal to processor 1160 to activate or deactivate one or more of the vibrotactile devices 1140.

Vibrotactile system 1100 may optionally include other subsystems and components, such as touch-sensitive pads 1190, pressure sensors, motion sensors, position sensors, lighting elements, and/or user interface elements (e.g., an on/off button, a vibration control element, etc.). During use, vibrotactile devices 1140 may be configured to be activated for a variety of different reasons, such as in response to the user's interaction with user interface elements, a signal from the motion or position sensors, a signal from the touch-sensitive pads 1190, a signal from the pressure sensors, a signal from the other device or system 1170, etc.

Although power source 1150, processor 1160, and communications interface 1180 are illustrated in FIG. 11 as being positioned in haptic device 1120, the present disclosure is not so limited. For example, one or more of power source 1150, processor 1160, or communications interface 1180 may be positioned within haptic device 1110 or within another wearable textile.

Figure 12:
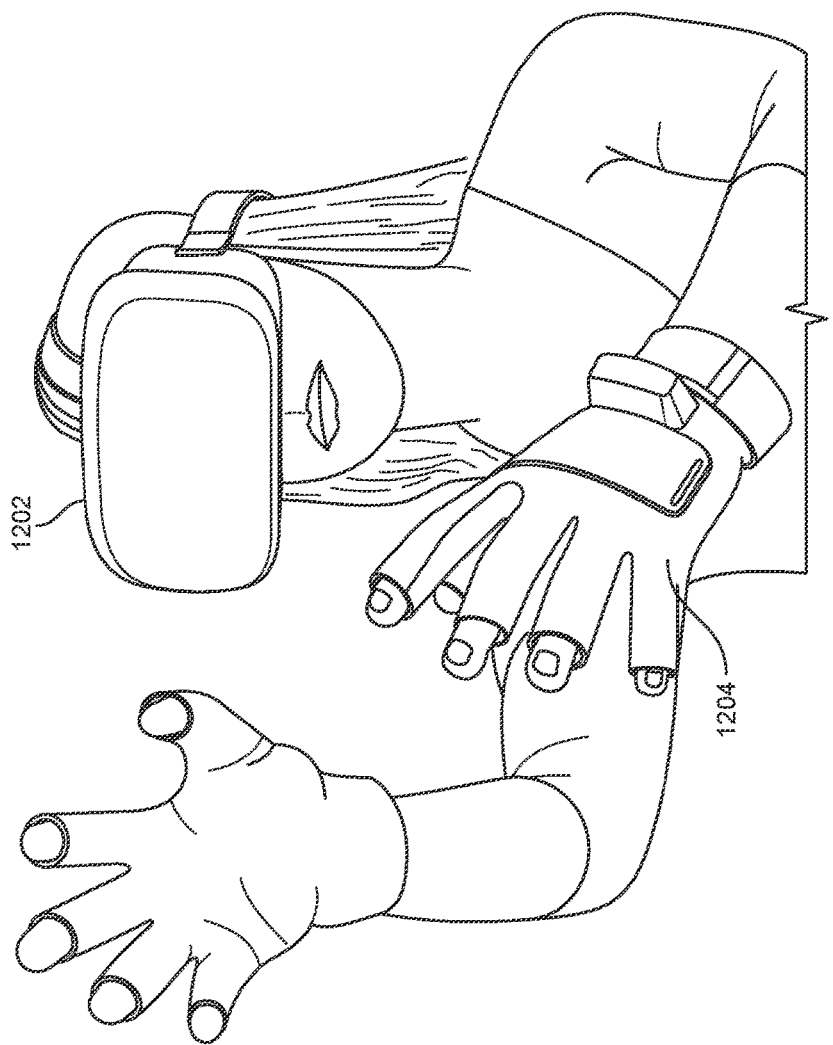
FIG. 12 is an illustration of an exemplary virtual-reality environment according to embodiments of this disclosure.

Haptic wearables, such as those shown in and described in connection with FIG. 11, may be implemented in a variety of types of artificial-reality systems and environments. FIG. 12 shows an example artificial-reality environment 1200 including one head-mounted virtual-reality display and two haptic devices (i.e., gloves), and in other embodiments any number and/or combination of these components and other components may be included in an artificial-reality system. For example, in some embodiments there may be multiple HMDs each having an associated haptic device, with each HMD and each haptic device communicating with the same console, portable computing device, or other computing system.

Figure 10:
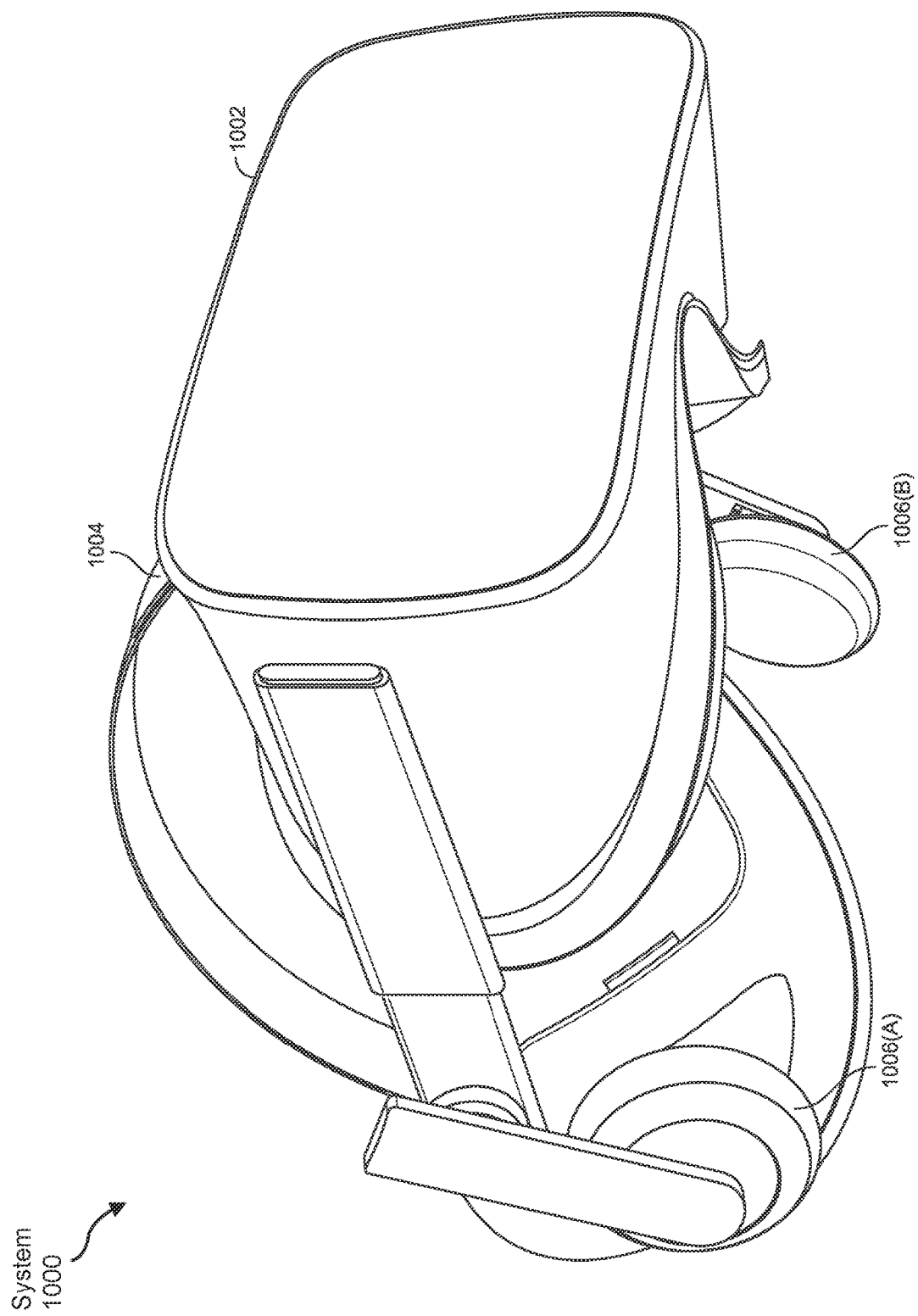
FIG. 10 is an illustration of an exemplary virtual-reality headset that may be used in connection with embodiments of this disclosure.

HMD 1202 generally represents any type or form of virtual-reality system, such as virtual-reality system 1000 in FIG. 10. Haptic device 1204 generally represents any type or form of wearable device, worn by a user of an artificial-reality system, that provides haptic feedback to the user to give the user the perception that he or she is physically engaging with a virtual object. In some embodiments, haptic device 1204 may provide haptic feedback by applying vibration, motion, and/or force to the user. For example, haptic device 1204 may limit or augment a user's movement. To give a specific example, haptic device 1204 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 1204 to send action requests to a console. Examples of action requests include, without limitation, requests to start an application and/or end the application and/or requests to perform a particular action within the application.

Figure 13:
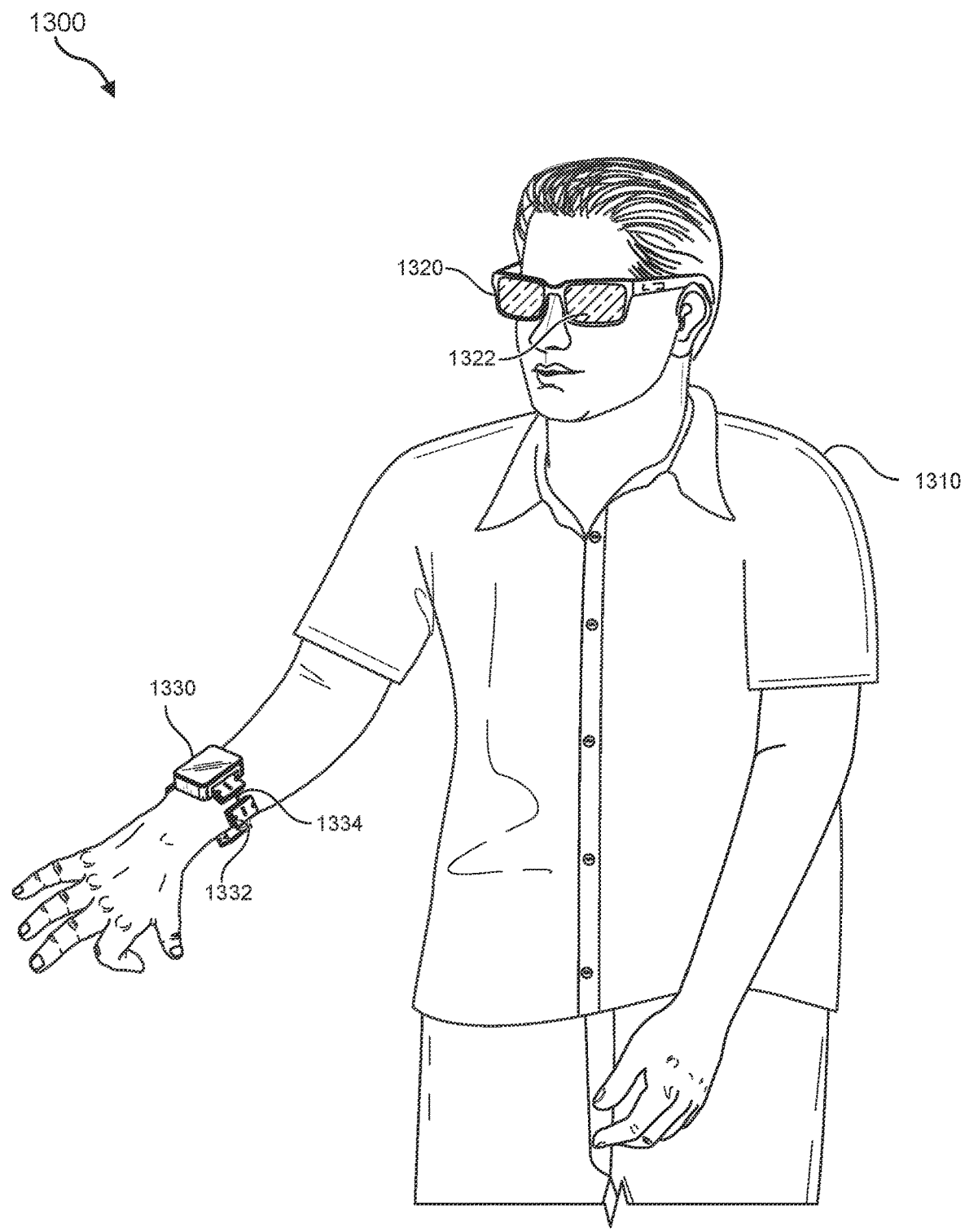
FIG. 13 is an illustration of an exemplary augmented-reality environment according to embodiments of this disclosure.

While haptic interfaces may be used with virtual-reality systems, as shown in FIG. 12, haptic interfaces may also be used with augmented-reality systems, as shown in FIG. 13. FIG. 13 is a perspective view of a user 1310 interacting with an augmented-reality system 1300. In this example, user 1310 may wear a pair of augmented-reality glasses 1320 that may have one or more displays 1322 and that are paired with a haptic device 1330. In this example, haptic device 1330 may be a wristband that includes a plurality of band elements 1332 and a tensioning mechanism 1334 that connects band elements 1332 to one another. Additionally or alternatively, haptic device 1530 may include and/or represent a haptic smartwatch and/or a smartwatch with haptic features.

One or more of band elements 1332 may include any type or form of actuator suitable for providing haptic feedback. For example, one or more of band elements 1332 may be configured to provide one or more of various types of cutaneous feedback, including vibration, force, traction, texture, and/or temperature. To provide such feedback, band elements 1332 may include one or more of various types of actuators. In one example, each of band elements 1332 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1110, 1120, 1204, and 1330 may include any suitable number and/or type of haptic transducer, sensor, and/or feedback mechanism. For example, haptic devices 1110, 1120, 1204, and 1330 may include one or more mechanical transducers, piezoelectric transducers, and/or fluidic transducers. Haptic devices 1110, 1120, 1204, and 1330 may also include various combinations of different types and forms of transducers that work together or independently to enhance a user's artificial-reality experience. In one example, each of band elements 1332 of haptic device 1330 may include a vibrotactor (e.g., a vibrotactile actuator) configured to vibrate in unison or independently to provide one or more of various types of haptic sensations to a user.

The process parameters and sequence of the steps described and/or illustrated herein are given by way of example only and may be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. A system comprising:
   a wireless charger configured to wirelessly transfer power within a coverage area;
   a head-mounted display dimensioned to be worn by a user, wherein the head-mounted display is configured to obtain data indicative of a current position of the head-mounted display relative to the coverage area; and
   at least one processing device configured to provide at least one indicator of an effective charging position for the head-mounted display relative to the coverage area based at least in part on the data, wherein the indicator of the effective charging position comprises a visual representation of a map that illustrates a plurality of charging zones within the coverage area.

2. The system of claim 1, wherein:
   the processing device is incorporated into the head-mounted display; and
   the head-mounted display is further configured to provide the indicator of the effective charging position for presentation to the user.

3. The system of claim 2, wherein the map further illustrates the effective charging position relative to the plurality of charging zones.

4. The system of claim 3, wherein the indicator further comprises a visual marker that indicates where the user is to place the head-mounted display to achieve the effective charging position.

5. The system of claim 4, wherein the charging zones comprise at least one of:
   a first charging zone; or
   a second charging zone that is more effective than the first charging zone.

6. The system of claim 1, wherein the data comprises at least one of:
   simultaneous localization and mapping (SLAM) data that corresponds to the current position of the head-mounted display; or
   power-transfer data that represents an amount of power transferred by the wireless charger to the head-mounted display in the current position.

7. The system of claim 6, wherein:
   the wireless charger is configured to provide a fiducial marker to the head-mounted display; and
   the SLAM data accounts for the fiducial marker.

8. The system of claim 7, wherein the fiducial marker comprises at least one of:
   a physical feature that indicates a location of the wireless charger; or
   a beacon that indicates a location of the wireless charger.

9. The system of claim 1, wherein the wireless charger comprises a near-field charger that is hidden from view of the head-mounted display.

10. The system of claim 1, wherein:
    the wireless charger comprises a far-field charger configured to wirelessly transmits a charging beam;
    the processing device is incorporated into the far-field charger; and
    the wireless charger is further configured to modify the charging beam to achieve the effective charging position for the head-mounted display based at least in part on the indicator.

11. The system of claim 10, wherein the wireless charger is configured to modify the charging beam by at least one of:
    steering the charging beam of the far-field charger to the effective charging position for the head-mounted display based at least in part on the indicator; or
    changing at least one setting of the far-field charger to alter a charging beam of the far-field charger for the effective charging position for the head-mounted display.

12. The system of claim 1, wherein the processing device is further configured to direct the wireless charger or the head-mounted display to provide, for presentation to the user, a recommendation on where the user is to place the wireless charger to achieve the effective charging position based at least in part on the indicator.

13. The system of claim 12, wherein:
    the recommendation comprises a visual feature indicating where the user is to place the wireless charger to achieve the effective charging position;
    the processing device is incorporated into the head-mounted display; and
    the head-mounted display is further configured to provide the visual feature for visual presentation to the user.

14. A head-mounted display comprising:
    at least one camera configured to capture imagery of a surrounding environment;
    a wireless receiver configured to receive, from a wireless charger located in the surrounding environment, power to charge a battery; and
    at least one processing device configured to:
        generate at least one indicator of an effective charging position relative to a coverage area based at least in part on the imagery, wherein the indicator of the effective charging position comprises a visual representation of a map that illustrates a plurality of charging zones within the coverage area; and
        provide the indicator of the effective charging position for presentation to a user.

15. The head-mounted display of claim 14, wherein the map further illustrates the effective charging position relative to the plurality of charging zones.

16. The head-mounted display of claim 15, wherein the indicator further comprises a visual marker that indicates where the user is to place the head-mounted display to achieve the effective charging position.

17. The head-mounted display of claim 16, wherein the charging zones comprise at least one of:
a first charging zone; or
a second charging zone that is more effective than the first charging zone.

18. The head-mounted display of claim 14, wherein:
the imagery is represented as simultaneous localization and mapping (SLAM) data; and
the processing device is further configured to generate the indicator of the effective charging position based at least in part on the SLAM data.

19. The head-mounted display of claim 14, wherein the processing device is further configured to:
identify an amount of power received by the wireless receiver from the wireless charger; and
generate the indicator of the effective charging position based at least in part on the imagery and the amount of power received by the wireless receiver.

20. A method comprising:
obtaining, by a head-mounted display worn by a user, data indicative of a current position of the head-mounted display relative to a coverage area of a wireless charger;
generating, based at least in part on the data, at least one indicator of an effective charging position for the head-mounted display relative to the coverage area, wherein the indicator of the effective charging position comprises a visual representation of a map that illustrates a plurality of charging zones within the coverage area; and
providing, for presentation to the user, the indicator of the effective charging position to enable the user to place the head-mounted display in the effective charging position.

* * * * *